United States Patent
Quitoriano et al.

(10) Patent No.: US 10,531,241 B2
(45) Date of Patent: Jan. 7, 2020

(54) NETWORK COMPUTER SYSTEM TO COORDINATE DELIVERY OF NETWORK CONTENT TO SERVICE PROVIDERS

(71) Applicant: Uber Technologies, Inc., San Francisco, CA (US)

(72) Inventors: Ashley Quitoriano, San Francisco, CA (US); Kamran Massoudi, San Francisco, CA (US); Arundhati Singh, San Francisco, CA (US); James Callender, San Franciscco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/201,640

(22) Filed: Nov. 27, 2018

(65) Prior Publication Data

US 2019/0166464 A1 May 30, 2019

Related U.S. Application Data

(60) Provisional application No. 62/590,880, filed on Nov. 27, 2017.

(51) Int. Cl.
*H04W 24/00* (2009.01)
*H04W 4/029* (2018.01)
(Continued)

(52) U.S. Cl.
CPC ............ *H04W 4/029* (2018.02); *H04L 67/16* (2013.01); *H04L 67/18* (2013.01); *H04W 4/20* (2013.01); *H04L 67/306* (2013.01)

(58) Field of Classification Search
None
See application file for complete search history.

(56) References Cited

U.S. PATENT DOCUMENTS

2013/0096827 A1 4/2013 McCall
2015/0161564 A1 6/2015 Sweeney
(Continued)

FOREIGN PATENT DOCUMENTS

CN 108009189 5/2018
WO WO 2018/217736 11/2018

OTHER PUBLICATIONS

ISR and Written Opinion in PCT/US2018/062664 dated Mar. 6, 2019.

*Primary Examiner* — Erika A Washington
(74) *Attorney, Agent, or Firm* — Mahamedi IP Law LLP

(57) ABSTRACT

A network computer system can detect a triggering event, and in response to the detection of the triggering event, obtain a set of service parameters relating to a service session of a service provider. Additionally, the network computer system can obtain one or more content items from a plurality of network information services, based on the set of service parameters. In some examples, each of the one or more content items can include a set of feature data. In such examples, the network computer system can provide the set of feature data of each of the one or more content items to a computing device of the service provider. Additionally, the network computer system can utilize a set of prioritization rules to determine a prioritization between each of the one or more content items. Based on the prioritization and the feature data of each of the one or more content items, the network computer system can cause an application running on the computing device of the service provider to generate each of the one or more content items.

18 Claims, 5 Drawing Sheets

(51) Int. Cl.
*H04L 29/08* (2006.01)
*H04W 4/20* (2018.01)

(56) References Cited

U.S. PATENT DOCUMENTS

| | | |
|---|---|---|
| 2016/0033297 A1 | 2/2016 | Konishi |
| 2016/0104112 A1 | 4/2016 | Gorlin |
| 2017/0024393 A1 | 1/2017 | Choski |
| 2019/0019146 A1* | 1/2019 | Chraibi .............. G06Q 10/0834 |

* cited by examiner

NETWORK COMPUTER SYSTEM TO COORDINATE DELIVERY OF NETWORK CONTENT TO SERVICE PROVIDERS

RELATED APPLICATION

This application claims benefit of priority to U.S. Provisional Patent Application No. 62/590,880, filed Nov. 27, 2017, titled NETWORK COMPUTER SYSTEM TO COORDINATE DELIVERY OF NETWORK CONTENT TO SERVICE PROVIDERS; the aforementioned application being hereby incorporated by reference in its entirety.

BACKGROUND

Numerous on-demand services exist to offer users a variety of services: transportation, shipping, food delivery, groceries, pet sitting, mobilized task force and others. Typically, on-demand services leverage resources available through mobile devices, such as wireless (e.g., cellular telephony) devices, which offer developers a platform that can access sensors and other resources available through the mobile device. Many on-demand services include dedicated applications (sometimes referred to as "apps") to communicate with a network service through which an on-demand service is offered.

Figure 1:
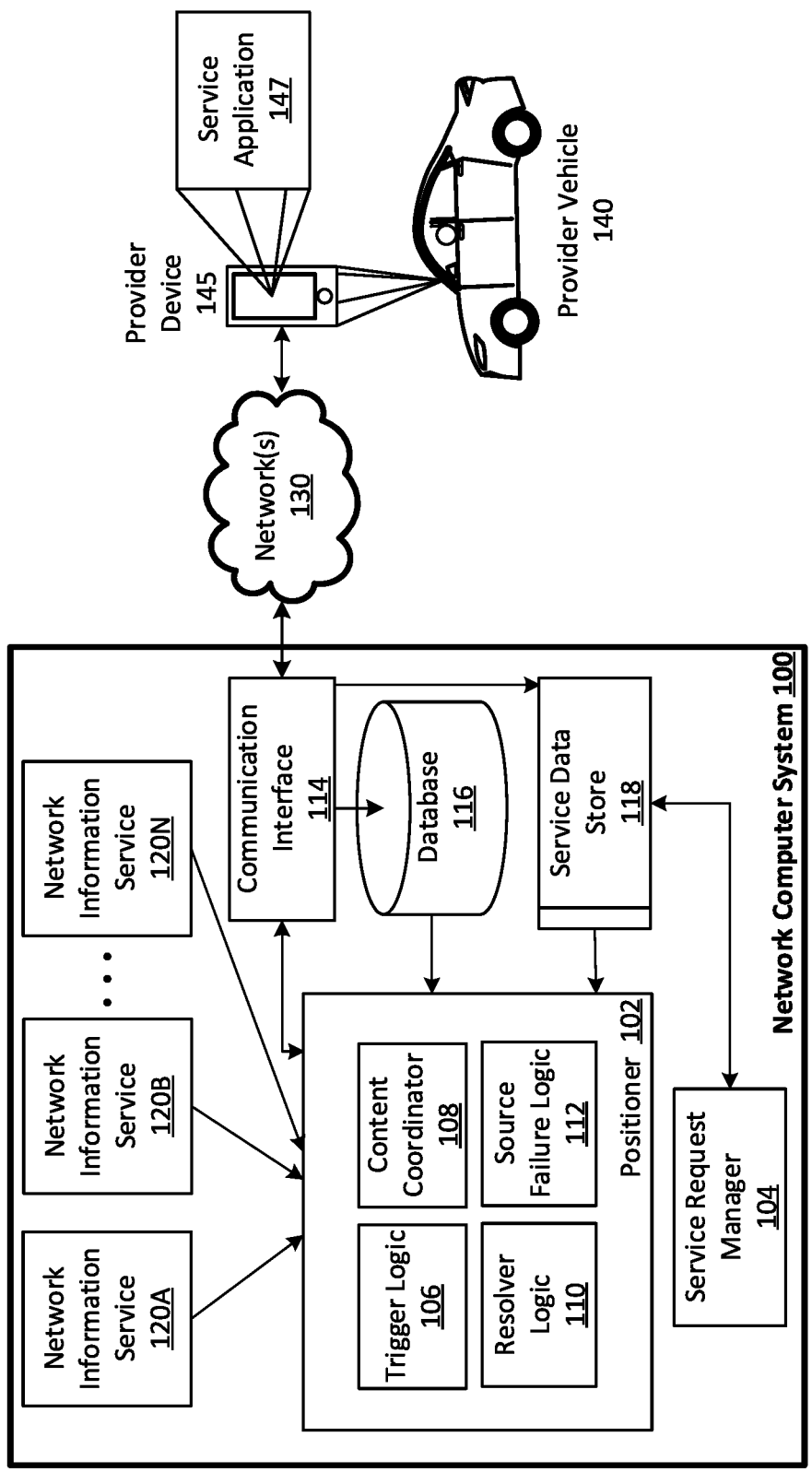
FIG. 1 illustrates an example network computer system to coordinate delivery of network content to service providers.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Examples provide for a network computer system to manage delivery of network content from multiple content sources to a service provider based on a variety of conditions and triggers. Examples recognize that service providers (e.g., drivers who provide on-demand transport services) operate devices that receive various types of service-related content while operating their respective service vehicles. The service-related content may originate from multiple different content sources or network information services that operate independently of one another. In many cases, the presentation of the service-related content from the multiple different content sources is not organized in any meaningful way and may be presented all at once, causing a service provider to be overwhelmed and to miss information which may otherwise have been useful for them to receive.

In some examples, a network computer system can operate to intelligently coordinate the delivery of content items from multiple content sources to targeted computing devices of service providers, in context of the service providers performing tasks for a network service (e.g., on-demand service). In such examples, the network computer system can detect one or more conditions or triggering events that can separately trigger a content source to provide corresponding content items to the network computer system. In turn, the network computer system can deliver the corresponding content items to the computing device of a service provider.

In other examples, a network computer system can determine and obtain information that a content source can use to determine what content items to provide to the service provider. In such examples, the information can be obtained from the computing device of the service provider. Additionally, the network computer system can obtain such information before providing such information to the content source. In turn, based on such information, the content source can provide content items to the network computer system.

In various examples, multiple content items from multiple content sources are set to share a triggering event for a given computing device of a service provider. In such examples, the network computer system can determine and obtain the information each of the multiple content sources can utilize to determine what content items to provide to the service provider. Additionally, the multiple content sources can be content sources whose content items are associated with a detected triggering event. As such, in such examples, instead of each content source determining and obtaining such information, network resources can be saved by one component, the network computer system, determining and obtaining such information.

As described by various examples, a network computer system can deliver or provide content items to computing devices of the service providers in a manner that manages the content delivery for a specific context of the service provider. Such content items can originate from independent sources. By accommodating a specific context of the service provider (e.g., service provider location, service provider status, etc.), the network computer system can prioritize content items for selection and delivery to individual service providers. Moreover, the network computer system can time the delivery and replacement of content item to triggers associated with individual service providers. In this way, the network computer system can remotely coordinate the delivery of the content item without intervention from the content sources or the end user devices.

As provided herein, the terms "user," "operator" and "service provider" are used throughout this application interchangeably to describe person utilizing a provider application on a computing device to provide on-demand transport services. A service requester can be a person or group of people who utilize a requester application on a computing device to request, over one or more networks, on-demand services from a network computing system.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Description

FIG. 1 illustrates an example network computer system to coordinate delivery of network content to service providers. In particular, a network computer system 100 can coordinate the delivery of one or more content items from multiple content sources (e.g., network information service 120A, network information service 120B, . . . , network information service 120N; collectively "network information services") to mobile computing devices (e.g., a computing device such as, smartphones, tablet computers, virtual reality or augmented reality handsets, on-board computing systems of vehicles, etc.) of respective service providers. For example, network computer system 100 can coordinate the delivery of content items that originate from multiple network information services to a computing device of a service provider (represented by provider device 145). Additionally, in such examples, network computer system 100 can coordinate the delivery of the content items from multiple network information services to provider device 145, without each network information service directly communicating with provider device 145. While in an example such as shown by FIG. 1, the network information services are shown as being a part of network computer system 100, in other examples, the network information services can originate from third-parties. As such, the network information services can include third-party information services.

In some implementations, network computer system 100 can coordinate the delivery of content items from multiple network information services to provider device 145 based on a variety of conditions and/or in response to any of numerous possible triggering events. For example, network computer system 100 can detect one or more conditions and/or triggering events. Each detected condition or triggering event that can cause one or more content source or network information services (e.g., network information service 120A, network information service 120B, . . . , network information service 120N) to provide corresponding content items or triggered content items to network computer system 100. In turn, network computer system 100 can provide such triggered content items to provider device 145 as a response to detecting the one or more conditions or triggering events.

Network computer system 100 can include positioner 102 to coordinate the delivery of content items from multiple network information services to provider device 145. The delivery of content items can be based on a variety of conditions, triggers or triggering events. In some implementations, positioner 102 can include trigger logic 106, content coordinator 108, resolver logic 110 and source failure logic 112 to coordinate such delivery.

According to examples, trigger logic 106 can detect triggering events from provider device 145 and/or from a network information service (e.g., network information service 120A). Examples of triggering events from provider device 145 can include launching of service application 147, status of the service provider (e.g., online, offline, off-trip or on-trip), a service option associated with the service provider, and location of the service provider (or provider vehicle 140) based on the location information generated by a location-based resource of provider device 145. Additionally, examples of triggering events from a network information service can include a service state (e.g., status of the available service providers in comparison to the number of requests from requesters) and a change in a geofence configuration. In such examples, each triggering event can be associated with a content item originating from one of the network information service.

Content coordinator 108 can retrieve one or more content items from the multiple network information services in response to the detected triggering event. Examples of content items can include, a map, a heat map, a next card, one or more positioning recommendations, estimated time to request (ETR) notification, one or more pins, one or more markers, queue position notification, service state related content (e.g., surge related content), status recommendation (e.g., go offline or stay online) and incentive related content.

In some implementations, content coordinator 108 can obtain the one or more content items based on a service parameter or set of service parameters associated with each content item. For example, the content coordinator 108 can determine one or more content items that are associated with the detected triggering event, such as, service provider vehicle entering a geofenced area, for example an airport. Additionally, content coordinator 108 can determine a service parameter or a set of service parameters associated with the content item associated with the detected triggering event. A service parameter is a parameter that can be utilized by a network information service (e.g., network information service 120A) to determine one or more content items the network information service can deliver to provider device 145.

Content coordinator 108 can obtain a service parameter or a set of service parameters from data or information stored in network computer system 100. For example, network computer system 100 can coordinate the delivery of content items to service providers in the context of an on-demand transport service. In such implementations, network computer system 100 can include service request manager 104 to manage the on-demand transport service by assigning or matching a service request from a requester to an available service provider. Additionally, service request manager 104 can store all the obtained service requests, assigned and unassigned. The service request can include service locations (e.g., a pickup location and/or a destination location). In some implementations, information (e.g., the service locations) associated with each matched or assigned service request can be associated with a corresponding service provider account stored in service data store 118. As such, content coordinator 108 can obtain service parameters (e.g., the service locations) from each assigned or matched service request from service data store 118. For example, upon trigger logic 106 detecting a trigger event (e.g., a change in location of the service provider or provider vehicle 140), content coordinator 108 can determine an associated content item. In such an example, the content item can be associated with a service parameter that can be obtained from an assigned or matched service request. As such, content coordinator 108 can determine the associated service parameter and obtain the associated service parameter from a corresponding service provider account stored in service data store 118.

As an addition or variation, some of the service parameters can be obtained from provider device 145 and/or network computer system 100. In some examples, a service status of a service provider can be obtained from provider device 145. The service status can identify information such as launching of service application 147 and the service provider is "online" as indicating the service provider is available to provide an on-demand service and the service provider is "offline" as indicating the service provider is unavailable to provide an on-demand service while service application 147 is running on provider device 145. In some examples, the service status can be in the context of an on-demand transport service. In such examples, the service status can include whether the service provider has been matched to a service request and whether the service provider is on-route to the pick-up or destination location included in the service request. In other examples, location information of the service provider can be obtained from a location-based resource of provider device 145.

In implementations where a triggering event can be associated with multiple content items from multiple network information services, content coordinator 108 can determine and obtain a service parameter or a set of service parameters for the individual network information service (e.g., the network information services whose content item is associated with the detected triggering event). Additionally, the multiple network information services can be content sources whose content items are associated with a detected triggering event. In such implementations, instead of each individual network information service determining and obtaining the service parameter or set of service parameters, network resources can be saved as content coordinator 108 can determine and obtain the service parameter or set of service parameters for the individual network information services. Content coordinator 108 can obtain one or more content items associated with the detected triggering event based on a service parameter or set of service parameters associated with the one or more content items. Each content item can include a set of feature data. Feature data can include information that specifies the functionality and/or aesthetics of the corresponding content item. Examples of feature data can include graphics data indicating a graphical representation of the content item (e.g., color, font, layout, shape, design, etc.), display positioning data indicating a location on service application 147 that the corresponding content item is to be presented, and a time to live parameter. As such, in response to provider device 145 receiving the set of feature data, in some implementations, service application 147 running on provider device 145 can generate consumable content corresponding to the received set of feature data.

In implementations where multiple content items from multiple network information services share the same triggering event, conflicts can arise. In such implementations, positioner 102 can include resolver logic 110 to detect and resolve such conflicts. A conflict may exist when, for example, content items share a triggering event, and when delivered to provider device 145 to be displayed, the resulting displayed content of the triggered content items combines or otherwise overlaps portions from separate content sources, causing the displayed content of each triggered content item to be diminished or otherwise not consumable (e.g., garbled). In some examples, resolver logic 110 can detect whether triggered content items conflict based on feature data of the triggered content items. For instance, based on feature data of the triggered content items, resolver logic 110 can determine a conflict may exist amongst triggered content items on provider device 145 when triggered content items overlap in time and include the same display positioning data, such that if service application 147 were to generate the triggered content items simultaneously, the consumable content of each triggered content item would be presented on the same location of a display on provider device 145.

In some implementations, resolver logic 110 can utilize one or more prioritization rules to determine which conflicting triggered content items service application 147 is to generate. For instance, resolver logic 110 can utilize a set of prioritization rules to determine which conflicting triggered content items to provide to provider device 145 to generate. In other instances, resolver logic 110 can use the set of prioritization rules to determine a ranking for each conflicting triggered content item. Additionally, based on that ranking, resolver logic 110 can determine and cause provider device 145 to generate one conflicting triggered content item over the other another conflicting triggered content item (e.g., by providing (i) the feature data of the conflicting triggered content items and (ii) an instruction to the provider device 145 indicating which feature data to utilize).

In some implementations, one or more prioritization rules can be based on a geographic region or location. For example, a prioritization rule can prioritize content items that are associated with a triggering event related to a particular geographic region/location (e.g., entering or being located at a specific geographic region or location, for example an airport). As such, resolver logic 110 can utilize such a prioritization rule to determine which of the conflicting triggering content items to prioritize for service application 147. In turn, service application 147 can generate conflicting triggered content items based on the prioritized content items.

For example, an airport queue notification (e.g., a notification indicating a service provider's queue placement before receiving a service request related to a transport request specifying that the airport is the pick-up location) may be associated with a triggering event corresponding to the service provider entering an airport area. Additionally, a positioning recommendation (e.g., a recommendation for the service provider to travel to a location that can result in higher earnings or greater service requests) may be associated with a triggering event that corresponds to a service provider changing locations. Moreover, sets of feature data of positioning recommendation and airport queue notification include display positioning data indicating that the corresponding consumable content of said triggered content items be presented on the same location or position of service application 147. For example, if trigger logic 106 detects that the service provider is entering the airport area (e.g., based on the location information provided by a location-based resource of provider device 145), content coordinator 108 can determine that the triggering event can be associated with the airport queue notification. Additionally, content coordinator 108 can also determine that the triggering event is also associated with the positioning recommendation because entering into the airport area is a change in location of the service provider (or provider vehicle 140).

Moreover, upon trigger logic 106 detecting the triggering event, entering the airport area and a change in location of the service provider, resolver logic 110 can detect the conflict between the airport queue notification and the positioning recommendation, based on their respective display positioning data. Resolver logic 110 can resolve such a conflict by utilizing the prioritization rule that prioritizes the conflicting triggered content item that is associated with the service provider currently entering or being located at the airport. In such an example, resolver logic 110 can prioritize the airport queue notification or determine that the airport queue notification has a higher priority than the positioning recommendation. Based on such a prioritization and prioritization rule, service application 147 can generate the airport queue notification over the positioning recommendation.

In other implementations, resolver logic 110 can utilize a prioritization rule that is based on account information of a service provider. In various implementations, the account information of a service provider can be associated with a service provider account stored in database 116. Additionally, the account information can include one or more network content preferences. A network content preference can indicate one or more triggered content items that service application 147 is to generate over other triggered content items. As such, resolver logic 110 can utilize such a prioritization rule to determine which of the conflicting triggered content items to prioritize for service application 147. In turn, service application 147 can generate conflicting triggered content items based on the prioritized content items.

In some implementations, a service provider can provide to network computer system 100 one or more network content preferences via service application 147. Network computer system 100 can associate the obtained one or more network content preferences with a corresponding service provider account stored in database 116. Additionally, in various implementations, a network content preference can include ranking data. Ranking data can indicate how the service provider ranks or prioritizes one content item from another content item. In such implementations, the service provider can indicate, via service application 147, how the service provider ranks or prioritizes the content item. For example, the ranking data can indicate that a service provider prioritizes the generation of a positioning recommendation higher than an ETR notification, but lower than incentive related content. Additionally, the positioning recommendation, the ETR notification and the incentive related content share the same triggering event and their respective feature data includes display positioning data indicating that the corresponding consumable content of the content items be presented on the same area on service application 147. As such, upon trigger logic 106 detecting the shared triggering event, resolver logic 110 can detect the conflict, and utilize such a prioritization rule (e.g., based on the ranking data) to prioritize the incentive related content for service application 147. In turn, service application 147 can generate the incentive related content.

In some implementations, network content preferences can be based on historical driving data of the service provider. For example, in such implementations, the historical driving data can include data of each service session that indicates geographic regions/locations the service provider has been (e.g., based on location information provided by a location-based resource of provider device 145), service status information, sensor information (e.g., accelerometer data, gyroscope data, etc.) and/or data indicating a suggestion or recommendation notification the service provider opts into or out of. In such implementations, resolver logic 110 can utilize the historical driving data of the service providers to determine network content preferences. For example, the historical driving data indicates that during a service session, more often than not, a service provider opts into a positioning recommendation (e.g., provides an input via service application 147 that indicates acceptance of the positioning recommendation) and rejects an ETR notification (e.g., provided an input via service application 147 that indicates rejection of the positioning recommendation). As such, resolver logic 110 can determine a network content preference for the positioning recommendation over the ETR notification. In turn, service application 147 can generate content items based on the network content preference.

In various implementations, the historical data can implicitly indicate a network content preference. For example, the historical data indicates that during multiple service sessions, the service provider provided an input via service application 147 that indicates acceptance of the positioning recommendation. Additionally, based on the location information provided by the location-based resource of provider device 145, the service provider ultimately ends up in a geographic region or location that is not included in the positioning recommendation. Moreover, based on the location information, the historical data indicates that the service provider usually is usually in an airport geofence. As such, resolver logic 110 can determine a network content preference for an airport queue notification over a positioning recommendation.

In some implementations, resolver logic 110 can provide a recommendation to the service provider (e.g., via service application 147), to change the network content preferences of the service provider. In such examples, resolver logic 110 can provide such a recommendation if resolver logic 110 determines the historical data of the service provider indicates a behavior of a service provider that is contrary to one or more network content preferences associated with the corresponding service provider account. For example, resolver logic 110 can determine that an account information of a corresponding service provider indicates a network content preference for a positioning recommendation for a food service. Additionally, resolver logic 110 determines that the historical driving data of the corresponding service provider indicates that during each service session, more often than not, the type of service the service provider is providing is related to a transport service rather than a food service. Moreover, resolver logic 110 can determine that the network content preferences of the service provider are contrary to the historical data of the service provider. As such, resolver logic 110 can cause service application 147 to generate a recommendation notification to change the network content preference from a positioning recommendation for a food service to a positioning recommendation for a transport service. In some implementations, the recommendation notification can enable the service provider to update or change the network content preferences. In other examples, resolver logic 110 can automatically update or change the network content preferences, in response to resolver logic 110 determining the network content preferences of the service provider are inconsistent with the historical driving data of the service provider.

In other implementations, prioritization rules can be based on service objectives (e.g., supply efficiency, greatest earnings, etc.). For example, trigger logic 106 can detect a trigger event. The trigger event may be associated with three content items and content coordinator 108 obtains the three triggered content items. However, based on their respective feature data, the three triggered content items may be generated and presented on the same location or position on a display screen of provider device 145. As such, upon trigger logic 106 detecting the shared trigger event, resolver logic 110 can detect the conflict and determine which of the three triggered content items should be generated by service application 147 based on one or more service objectives (e.g., supply efficiency, greatest earnings, etc.). For instance, resolver logic 110 can determine that the content item that can result in the greatest earnings for the service provider can be prioritized for service application 147. In turn, service application 147 can generate consumable content for the provider, based on triggered content items that are selected or otherwise provided for the service provider based on an objective of maximizing the earnings of the service provider, given the service provider's location, service status, or other contextual information.

In various implementations, resolver logic 110 can rank each conflicting triggered content item relative to one or more service objectives to determine which of the conflicting triggered content items best accomplishes the one or more service objectives. For example, triggered content items selected for a service provider may include (i) a positioning recommendation, (ii) an offline suggestion, and (iii) an ETR notification. Additionally, the service object is supply efficiency of a geographic region. Moreover, the three triggered content items may include display positioning data indicating that the corresponding triggered content items be generated and presented at the same location or position on a display of provider device 145. Upon trigger logic 106 detecting the shared trigger event, resolver logic 110 can rank each of the three conflicting triggered content items according to the resulting supply efficiency of the geographic location based on (i) a current service state (e.g., the number of service requests specifying a pickup location in the geographic location provided by corresponding devices of the requesters and the number of available service providers in the geographic location, based on the location information and service status information of each provider device), (ii) a current location of the service provider or provider vehicle 140 (e.g., based on the location information provided by a location-based resource of provider device 145), and (iii) to what affect each of the three conflicting triggered content items can better increase the supply efficiency of that geographic region. Based on how each of the three conflicting triggered content items can better increase the supply efficiency of the geographic region, resolver logic 110 can determine a ranking for the three conflicting triggered content items. Additionally, based on the rankings, resolver logic 110 can determine which of the three conflicting triggered content items to prioritize for service application 147. In turn, service application 147 can generate triggered content items based on the prioritized content item.

In some implementations, prioritization rules can be based on a service status (e.g., online, offline, matched, on-route to a pick-up location, on-route to a destination location, etc.) the service provider. In such implementations, the service status can include a type of service the service provider is providing. As such, the prioritization rule can be based on the network content eligibility of the service provider based on whether the content item is related to the type of service the service provider is providing. For instance, two conflicting triggered content items are an airport queue notification and a positioning recommendation related to food services, and the service status information indicates that type of service is related to food services (e.g., food delivery). Resolver logic 110 can determine that the positioning recommendation related to food services is more related to the type of service the service provider is to provide, than the airport queue notification. As such, resolver logic 110 can determine the positioning recommendation related to food services can be prioritized for service application 147. In turn, service application 147 can generate the positioning recommendation related to food services.

In some examples, a service status of a service provider can be determined by trigger logic 106. Trigger logic 106 can obtain the service status information of the service provider from service status information of the corresponding service provider account stored in service data store 118. Service data store 118 can obtain service status information from a corresponding provider device 145 over network 130 and through communication interface 114. The service status information can indicate the status of the corresponding service provider. In various implementations, service data store 118 can update the service status information of the corresponding service provider account stored in service data store 118. For example, positioner 102 can update the service status information of a service provider associated with a corresponding service provider account stored in service data store 118, in response to a detected change in the service status of the service provider.

In yet other implementations, prioritization rules can be based on the feature data of conflicting triggered content items. For example, the prioritization rules can be based on the TTL parameter of each conflicting triggered content item. As such, resolver logic 110 can determine which of the conflicting triggered content items are about to expire first, and the triggered content item that is about to expire first can be prioritized. Additionally, in variations of such implementations, if a second triggered content item is to expire after the expiration of the prioritized triggered content item, then resolver logic 110 can cause service application 147 to generate the second triggered content item. For example, based on a determination by resolver logic 110 that a second triggered content item is to expire after the expiration of the prioritized triggered content item, content coordinator 108 can provide feature data of the second content to service application 147 to generate. In other examples, based on resolver logic 110 making a determination that a second triggered content item is to expire after the expiration of the prioritized triggered content item, content coordinator 108 can provide feature data of the conflicting triggered content items in response to detecting a shared triggering event. Additionally, resolver logic 110 can provide an instruction to service application 147 to generate the second triggered content item after generating the prioritized triggered content item.

In various implementations, resolver logic 110 can utilize any combination of the aforementioned prioritization rules to determine which conflicting triggered content item service application 147 is to generate. For example, trigger logic 106 detects a shared triggering event that the service provider has entered an airport and resolver logic 110 determines a conflict between an airport queue notification and a positioning recommendation notification. As such, resolver logic 110 can utilize multiple prioritization rules to resolve the conflict. For instance, resolver logic 110 can utilize prioritization rules that specify (i) prioritizing a conflicting triggered content item associated with an airport geofence and (ii) prioritizing a conflicting triggered content item with the TTL parameter that expires earlier. In such an example, resolver logic 110 can prioritize the airport queue notification, if resolver logic 110 determines that (i) the service provider is located within the airport geofence and (ii) the TTL parameter of the airport queue notification expires before the positioning recommendation notification. Additionally, in some implementations, resolver logic 110 can instruct provider device 145 to generate the positioning recommendation notification after the expiration of the airport queue notification. In such implementations, resolver logic 110 can determine that the TTL parameter of the airport queue notification expires before the TTL parameter of the positioning recommendation.

Additionally, in various examples, one prioritization rule can be ranked higher than another prioritization rule. For instance, resolver logic 110 can still prioritize the airport queue notification even if (i) the service provider is located at the airport, (ii) the TTL parameter of the airport queue notification is longer than the positioning recommendation and (iii) based on the location information provided by a location-based resource of provider device 145 the service provider is within the geofence of an airport. In such instances, the prioritization rule that specifies prioritizing a conflicting triggered content item that is associated with an airport geofence is ranked higher than the prioritization rule that specifies prioritizing a conflicting triggered content item with the TTL parameter that expires earlier.

In some implementations, positioner 102 can include source failure logic 112. Source failure logic 112 can disable a network information service (e.g., network information service 120A, network information service 120B, . . . , network information service 120N) that is operating improperly or the corresponding content item causes service application 147 or provider device 145 to operate improperly. For example, positioner 102 can obtain content item from a network information service 120 upon detecting a corresponding trigger. However, upon providing the set of feature data of the content item to provider device 145, service application 147 operates improperly (e.g., crashes). In such an example, provider device 145 can provide data indicating that utilization of the set of feature data caused service application 147 to operate improperly (e.g., crash). In response to positioner 102 receiving such data, source failure logic 112 can determine which network information service is providing content items (e.g., feature data) that are causing the problems. As such, source failure logic 112 can provide an instruction to the offending network information service to stop providing the offending content item to positioner 102 or cause positioner 102 to stop receiving content item specifically from the offending network information service, without shutting down the entire network computer system 100.

Network 130 can include one or more networks. Network 130 can be a conventional type, wired or wireless, and can have numerous configurations include a star a star configuration, token ring configuration, or other configurations. Furthermore, network 130 can include an intranet, a local area network (LAN), a wide area network (WAN) (e.g., the Internet), and/or other interconnected data paths across which multiple devices can communicate. In some embodiments, network 130 can be a peer-to-peer network. Network 130 can also be coupled with or include portions of a telecommunications network for sending data using a variety of different communication protocols. In some embodiments, network 130 can include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 130, network 130 can be more than one network. For example, as illustrated in FIG. 1, network computer system 100 and provider device 145, can communicate over network 130 using wired or wireless connections, or combinations thereof.

Example User Interfaces (UI)

Figure 2:
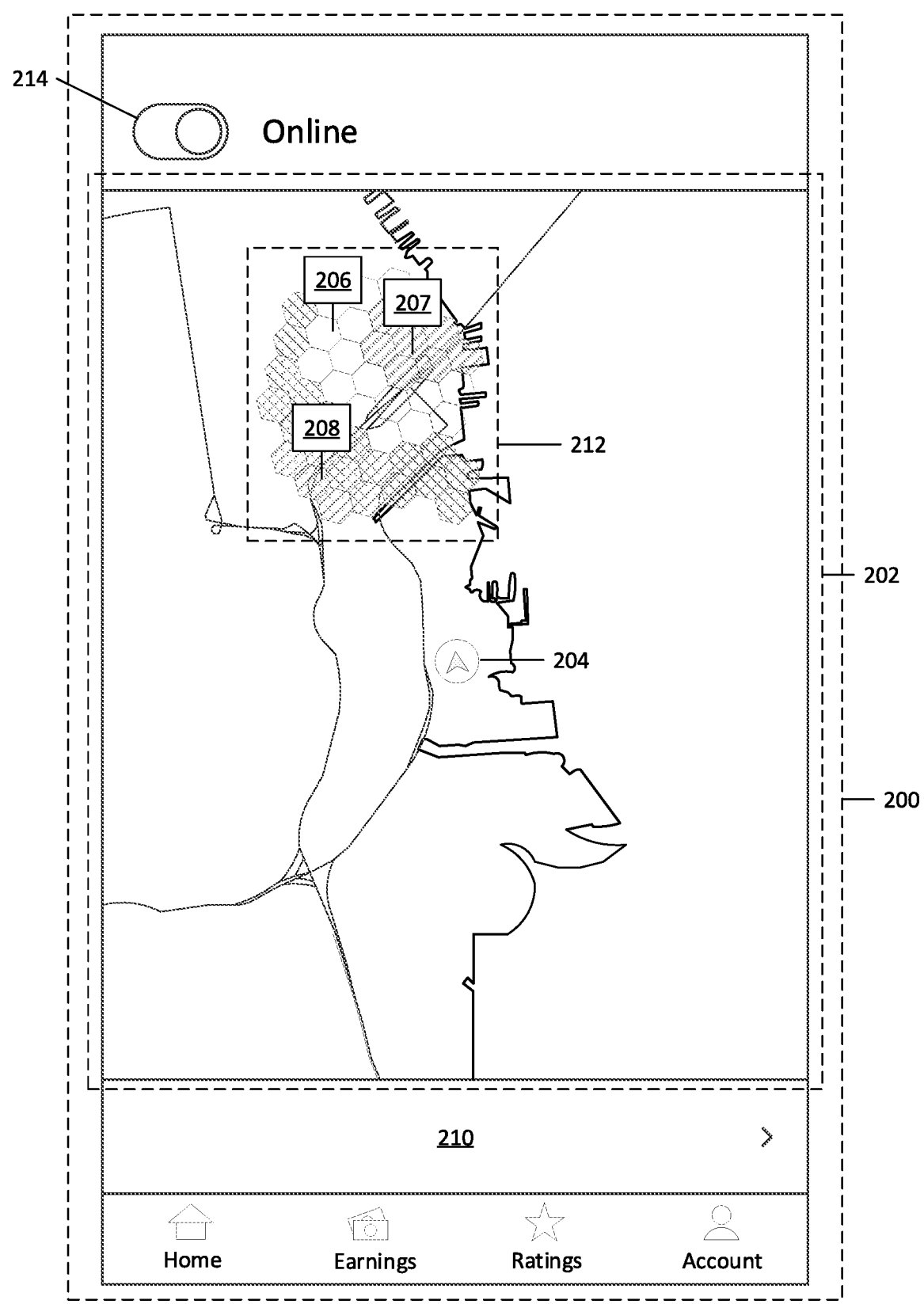
FIG. 2 illustrates an example user interface (UI) with the network content.

FIG. 2 illustrates an example UI with the network content. Example UI 200 can include network content or one or more content items from multiple network information services. The content items can be structured or laid out on UI 200 in a manner that maximizes the likelihood that the content items are to be consumed by a service provider of provider device 145. Additionally, the content items selected to be laid out on UI 200 can be tailored to a particular service provider. As described previously, a network computer system (e.g., network computer system 100) can select network content or one or more content items from multiple network based on, for example, triggering events, service parameters, prioritization rules, and/or historical driving data associated with the service provider of provider device 145. In some examples, the content items can be arranged in a manner that does not encumber the ability of a service provider to consume the content items displayed on UI 200. For example, as illustrated in FIG. 2, UI 200 can include content items that are arranged in a manner that does not restrict the consumption of map 202 or a navigation interface on UI 200.

Additionally, UI 200 can also include the content items pin 206, pin 207, pin 208, area 210, heat map 212 and service provider graphic 204. In some implementations, service provider graphic 204 can indicate the current location of the service provider or provider vehicle 140. Provider device 145 can utilize location information obtained from a location-based resource of provider device 145 to generate service provider graphic 204. In other implementations, a pin (e.g., pin 206, pin 207 and/or pin 208) can indicate points of interest, for example, areas of heightened earning potential or number of service requests.

In some implementations, UI 200 can be executed by service application 147. Additionally, positioner 102 can cause service application 147 to generate one or more content items (e.g., map 202, pin 206, pin 207, pin 208, area 210, heat map 212 and service provider graphic 204) on UI 200, in response to a triggering event. In various implementations, UI 200 can also include a status toggle 214. In such implementations, content coordinator 108 can detect whether the service provider is online or offline based on the toggle state of status toggle 214. For example, provider device 145 can provide service status information to positioner 102. The service status information can include the toggle state of status toggle 214 and the toggle state can indicate a status of the service provider. As illustrated in FIG. 2, status toggle 214 can include a toggle state that is associated with the "online" status. Other statuses that can be represented by status toggle 214 include offline, on-trip and off-trip.

In implementations where multiple content items from multiple network information services share the same triggering event, examples recognize that conflicts may arise. In such implementations, positioner 102 can include resolver logic 110 to detect and resolve such conflicts. A conflict may exist when, for example, content items share a triggering event, and when delivered to provider device 145 to be displayed, the resulting displayed content of the triggered content items combines or otherwise overlaps portions from separate content sources, causing the displayed content from each content sources to be diminished or otherwise not consumable (e.g., garbled). In some examples, resolver logic 110 can detect whether triggered content items conflict based on feature data of the triggered content items. For instance, based on feature data of the triggered content items, resolver logic 110 can determine a conflict may exist amongst triggered content items on provider device 145, when triggered content items overlap in time and include the same display positioning data, such that if service application 147 were to generate, the consumable content of each triggered content item would be presented on the same location of a display on provider device 145.

In some implementations, positioner 102 can include resolver logic 110 that can utilize a set of prioritization rules to resolve a conflict that exists. For example, resolver logic 110 can utilize the set of prioritization rules to determine which conflicting triggered content item service application 147 is to generate on UI 200. In some implementations, resolver logic 110 can utilize a set of prioritization rules to determine which conflicting triggered content items service application 147 is to generate. For instance, resolver logic 110 can utilize a set of prioritization rules to determine which conflicting triggered content item service to provide to provider device 145. In other instances, resolver logic 110 can the set of prioritization rules to determine a ranking for each conflicting triggered content item. Additionally, based on that ranking, resolver logic 110 can determine and cause provider device 145 to generate one conflicting triggered content item over the other another conflicting triggered content item (e.g., by providing (i) the feature data of the conflicting triggered content items and (ii) an instruction to the provider device 145 indicating which feature data to utilize).

In some implementations, resolver logic 110 can utilize a prioritization rule that is based on a current location of a service provider. For example, a prioritization rule can prioritize conflicting triggered content items that are associated with triggering event related to a particular geographic region/location (e.g., entering or being located at a specific geographic region or location, for example an airport). In such an example, an airport queue notification is associated with a triggering event of the service provider entering an airport area. Additionally, a positioning recommendation is associated with a triggering event of the service provider (or provider vehicle 140) changing locations. Moreover, sets of feature data of recommendation notification and airport queue notification include display positioning data indicating that the corresponding content items be generated on area 210. If trigger logic 106 detects that the service provider is entering the airport area, content coordinator 108 can determine the triggering event can be associated with both the airport queue notification (entering into the airport area) and the positioning recommendation (the location of the service provider or provider vehicle 140 is changing as the service provider or provider vehicle 140 enters the airport area). As such, resolver logic 110 can detect the conflict and resolve this conflict by utilizing the example prioritization rule. For instance, resolver logic 110 can prioritize the airport queue notification or determine that the airport queue notification has a higher priority than the positioning recommendation for service application 147. In turn, service application 147 can generate the airport queue notification in area 210.

In other implementations, resolver logic 110 can utilize a prioritization rule that is based on account information of a service provider. In various implementations, the account information of a service provider can be associated with a service provider account stored in database 116. Additionally, the account information can include one or more service provider specified network content preferences. A network content preference can indicate one or more triggered content items service application 147 is to generate over other triggered content items.

Additionally, in some implementations, a network content preference can include ranking data or information. Ranking data or information can indicate how the service provider ranks or prioritizes a triggered content item over other triggered content items. For example, the ranking data can indicate that a service provider prioritizes the generation of a positioning recommendation higher than an ETR notification, but lower than incentive related content. Additionally, the positioning recommendation, the ETR notification and the incentive related content share the same triggering event and their respective feature data includes display positioning data indicating that the corresponding content items be generated on area 210. As such, upon trigger logic 106 detecting the shared triggering event, resolver logic 110 can detect the conflict, and utilize such a prioritization rule (e.g., based on the ranking data) to prioritize the incentive related content for service application 147 to generate on area 210.

In various implementations, the prioritization rules are based on historical driving data associated with a service provider. Resolver logic 110 can utilize the historical driving data to determine conflicting triggered content items to prioritize for service application 147 to generate. For example, a positioning recommendation and an incentive related content share the same triggering event. Additionally, the feature data of the positioning recommendation and the incentive related content include display positioning data indicating that the corresponding content items be generated on area 210. In such an example, resolver logic 110 can determine from the historical driving data that during most service sessions, the service provider explicitly rejects (e.g., by interacting, for example swiping, with service application 147, to reject) the incentive related content. Additionally, resolver logic 110 can determine from the historical driving data that during most service sessions, the service provider opts into a positioning recommendation generated by service application 147 (e.g., based on location information provided by a location-based resource of provider device 145 and/or data corresponding to acceptance of the positioning recommendation via service application 147). Based on the historical driving data and upon trigger logic 106 detecting the shared triggering event, resolver logic 110 can detect the conflict and prioritize the positioning recommendation for service application 147. In turn, service application 147 can generate the positioning recommendation on area 210.

In various implementations, prioritization rules can be based on one or more service objectives (e.g., supply efficiency, greatest earnings, etc.). For example, trigger logic 106 can detect a trigger event. The trigger event is associated with three content items. In response to trigger logic 107 detecting the trigger event, content coordinator 108 obtains the three triggered content items. However, all three triggered content items, based on their respective feature data, will result in being generated on service application 147 at area 210. As such, upon trigger logic 106 detecting the shared trigger event, resolver logic 110 can detect the conflict and determine which of the three triggered content items to be generated on service application 147 based on one or more service objectives (e.g., supply efficiency, greatest earnings, etc.). For instance, resolver logic 110 can determine that the triggered content item that can result in the greatest earnings for the service provider can be prioritized for service application 147. In turn, service application 147 can generate consumable content for the service provider on area 210, based on triggered content items that are selected or otherwise provided for the provider based on an objective of maximizing the earnings of the provider, given the provider's location, service status, or other contextual information.

In some implementations, resolver logic 110 can rank each conflicting triggered content item relative to how well each conflicting triggered content item best accomplishes one or more service objectives and base which conflicting content triggered item for service application 147 on the rankings. For example, triggered content items selected for a service provider may include (i) a positioning recommendation, (ii) an offline suggestion, and (iii) an ETR notification and are all associated with the same triggering event and include display positioning data indicating that the corresponding triggered content items be generated on area 210. Additionally, the service object is supply efficiency of a geographic region. Upon trigger logic 106 detecting the shared trigger event, resolver logic 110 can rank each of the three conflicting triggered content items according to the resulting supply efficiency of the geographic location-based on (i) a current service state (e.g., the number of service requests specifying a pickup location in the geographic location provided by corresponding devices of the requesters and the number of available service providers in the geographic location, based on the location information and service status information of each provider device), (ii) a current location of the service provider or provider vehicle 140 (e.g., based on the location information provided by a location-based resource of provider device 145), and (iii) to what affect each of the three conflicting triggered content items can better increase the supply efficiency of that geographic region. Based on how each of the three conflicting triggered content items can better increase the supply efficiency of the geographic region, resolver logic 110 can determine a ranking for the three conflicting triggered content items. Additionally, based on the rankings, resolver logic 110 can determine which of the three conflicting triggered content items to prioritize for service application 147 to generate on area 210.

In some implementations, prioritization rules can be based on the service status (e.g., online, offline, matched, on-route to a pick-up location, on-route to a destination location, etc.) the service provider. For instance, the prioritization rules can be based on the network content eligibility of the service provider. Additionally, the service status can include the type of service the service provider is to provide. In some examples, a positioning recommendation related to a food service and a positioning recommendation related to a transport service share a triggering event. Additionally, the sets of feature data of the positioning recommendation related to the food service and the positioning recommendation related to the transport service include display positioning data indicating that the corresponding triggered content items be generated on area 210. Upon trigger logic 106 detecting the shared trigger event, resolver logic 110 can utilize a prioritization rule based on the service status of the service provider, as in such example, the content eligibility of the service provider, to determine which of the conflicting triggered content items to prioritize for service application 147 to generate in area 210. For instance, if resolver logic 110 determines from the service status information the service provider is providing a food related service, then resolver logic 110 can prioritize the positioning recommendation related to the food service. Alternatively, if resolver logic 110 determines from the service status information that the service provider is providing a transport related service, then resolver logic 110 can prioritize the positioning recommendation related to the transport service.

In yet other implementations, prioritization rules can be based on the feature data of conflicting triggered content items. For example, the prioritization rules can be based on the TTL parameter of each conflicting triggered content item. As such, resolver logic 110 can determine which of the conflicting triggered content items are about to expire first, and the triggered content item that is about to expire first can be prioritized for service application 147 to generate (e.g., on area 210). Additionally, in such implementations, if a second triggered content item is to expire after the expiration of the prioritized triggered content item, then resolver logic 110 can cause service application 147 to generate the second triggered content item after the expiration of the first triggered content item. In some examples, based on resolver logic 110's determination that a second triggered content item is to expire after the expiration of the prioritized triggered content item, content coordinator 108 can provide feature data of the second triggered content item to service application 147 to generate after detecting from service application 147 data indicating that the first triggered content item has expired. In other examples, based on a determination by resolver logic 110 that a second triggered content item is to expire after the expiration of the prioritized triggered content item, content coordinator 108 can provide feature data of all the conflicting triggered content items in response to detecting a shared triggering event and resolver logic 110 can provide an instruction to service application 147 to generate the second triggered content item after expiration of the prioritized first triggered content item.

In various implementations, resolver logic 110 can utilize any combination of the aforementioned prioritization rules to determine which conflicting triggered content item service application 147 is to generate (e.g., on area 210). For example, trigger logic 106 detects a shared triggering event that the service provider has entered an airport and resolver logic 110 determines a conflict between an airport queue notification and a positioning recommendation notification (e.g., display positioning data of the airport queue notification and positioning recommendation notification indicate that the corresponding content items be generated on area 210). As such, resolver logic 110 can utilize multiple prioritization rules to resolve the conflict. For instance, resolver logic 110 can utilize prioritization rules that specify (i) prioritizing a conflicting triggered content item associated with an airport geofence and (ii) prioritizing a conflicting triggered content item with the TTL parameter that expires earlier. In such an example, resolver logic 110 can prioritize the airport queue notification if resolver logic 110 determines that (i) the service provider is located within the airport geofence and (ii) the TTL parameter of the airport queue notification expires before the positioning recommendation notification. Additionally, in some implementations, resolver logic 110 can instruct provider device 145 to generate the positioning recommendation notification after the expiration of the airport queue notification. In such implementations, resolver logic 110 can determine that the TTL parameter of the airport queue notification is expires before the TTL parameter of the positioning recommendation.

Alternatively, in some examples, one prioritization rule can be ranked higher than another prioritization rule. For instance, resolver logic 110 can still prioritize the airport queue notification even if (i) the service provider is located at the airport, (ii) the TTL parameter of the airport queue notification is longer than the positioning recommendation notification and (iii) based on the location information provided by a location-based resource of provider device 145 the service provider is within the geofence of an airport. In such instances, the prioritization rule that specifies prioritizing a conflicting triggered content item that is associated with an airport geofence is ranked higher than the prioritization rule that specifies prioritizing a conflicting triggered content item with the TTL parameter that expires earlier.

Methodology

Figure 3:
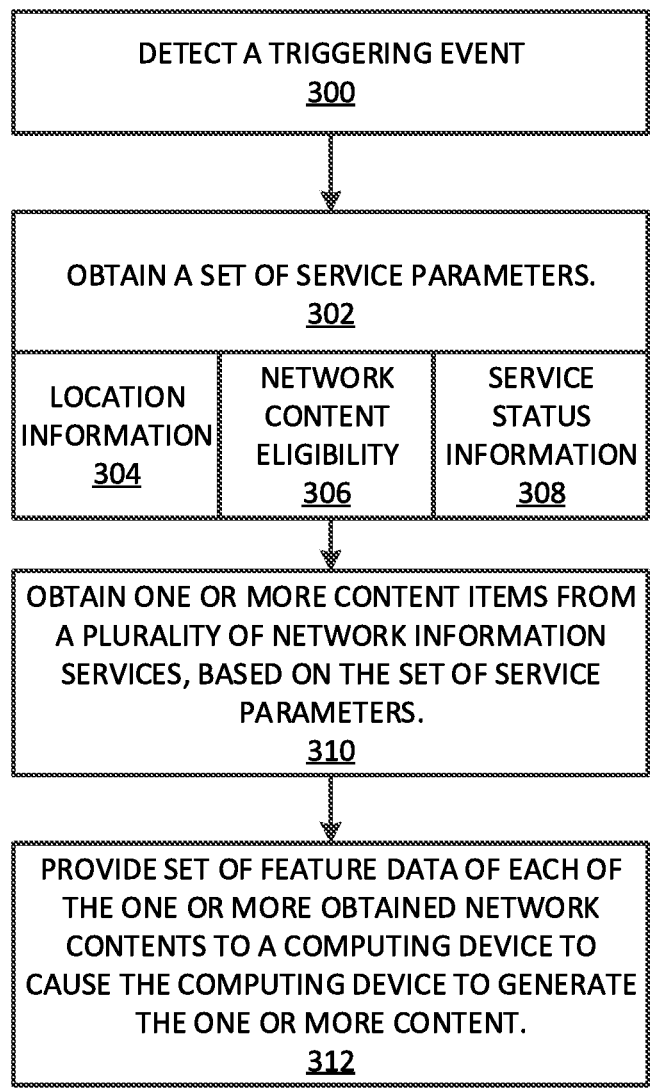
FIG. 3 illustrates an example method for coordinating delivery of network content to service providers.

FIG. 3 illustrates an example method for coordinating delivery of network content to service providers. In the below discussions of FIG. 3, reference may be made to reference characters representing like features as shown and described with respect to FIG. 1 for purpose of illustrating a suitable component for performing a set or sub-step being described. In some implementations, as illustrated in FIG. 3, positioner 102 can detect a triggering event (300). In such implementations, trigger logic 106 can detect a triggering event. Additionally, trigger logic 106 can detect a triggering event from provider device 145 and/or from a network information service (e.g., network information service 120A). Examples of triggering events from provider device 145 can include launching of service application 147, service status of the service provider (e.g., online, offline, matched, on-route to a pick-up location, on-route to a destination location, etc.), a service option associated with the service provider, and location of the service provider (or provider vehicle 140) based on the location information generated by a location-based resource of provider device 145. Additionally, examples of triggering events from a network information service can include, a service state (e.g., status of the available service providers in comparison to the number of requests from requesters) and a change in a geofence.

In some implementations, each triggering event can be associated with one or more content items. Additionally, each content item can be associated with service parameters or a set of parameters that a network information service (e.g., network information service 120A) may require, to determine what content the network information service can deliver to provider device 145. In such implementations, in response to and based on the triggering event, positioner 102 of network computer system 100 can obtain a set of service parameters (302). In such implementations, content coordinator 108 of positioner 102 can obtain the set of service parameters from provider device 145 and/or network computer system 100. Examples of service parameters content coordinator 108 can obtain from provider device 145 and/or network computer system 100 include location information of the service provider can be obtained from a location-based resource of provider device 145 (304) and network content eligibility of the service provider (306).

Additionally, a service parameter can include service status information of the service provider (308). The service status information of the service provider can be obtained from provider device 145. In some implementations, trigger logic 106 can obtain the service status information of the service provider from a corresponding service provider account stored in service data store 118. Examples of a status that trigger logic 106 detect from the service provider or determine from status data provided by provider device 145 include online, offline, matched, on-route to a pick-up location, on-route to a destination location, and/or the type of service the service provider is providing.

In other examples, some of the service parameters can be obtained from data or information stored in network computer system 100. For example, in implementations where network computer system 100 coordinates the delivery of network content or one or more content items to service providers in the context of an on-demand transport service, information associated with a service request (e.g., type of service requested, a pickup location and/or a destination location) can be stored in network computer system 100. In such an example, content coordinator 108 can utilize the information associated with the service request to obtain one or more content items from a network information service (e.g., network information service 120A).

Additionally, positioner 102 can obtain one or more content items from a plurality of network information services, based on the set of service parameters (310). In some implementations, based on the determined content items and the associated set of service parameters, content coordinator 108 can obtain one or more content items from a plurality of network information services. For example, trigger logic 106 can detect a triggering event, a change in location of the service provider or provider vehicle 140. In response to the detected triggering event, content coordinator 108 can determine a content item associated with the triggering event, for example, an ETR content from a network information service (e.g., network information service 120A). Additionally, content coordinator 108 can also determine a set of service parameters associated with the content item, for example, (i) the state of the service provider, the location information of the service provider, (ii) the number of unfulfilled service requests and (iii) the service location (e.g., the pickup location) specified in the unfulfilled service requests In implementations where a triggering event can be associated with multiple content items from multiple network information services, content coordinator 108 can determine and obtain a service parameter or a set of service parameters for the individual network information service (e.g., the network information services whose content item is associated with the detected triggering event). Additionally, the multiple network information services can be content sources whose content items are associated with a detected triggering event. In such implementations, instead of each individual network information service determining and obtaining the service parameter or set of service parameters, network resources can be saved as content coordinator 108 can determine and obtain the service parameter or set of service parameters for the individual network information services.

After obtaining one or more content items from a plurality of network information services, positioner 102 can provide the set of feature data of each of the one or more obtained content item to a computing device (e.g., provider device 145) to cause the computing device to generate the one or more content (312). Each content item can include feature data. Feature data can be information that specifies the functionality and/or aesthetics of the corresponding content item. In some implementations, content coordinator 108 can provide to service application 147 running on provider device 145 the set of feature data of a content item associated with the detected triggering event. Service application 147 can utilize the feature data to generate the corresponding content item.

In some implementations, multiple content items can be associated with a triggering event. In such implementations, conflicts can arise between multiple content items that are associated with the same triggering event, and when delivered to provider device 145, the resulting content combines or otherwise overlaps portions from separate content sources, causing the content from each content source to be diminished or otherwise not consumable (e.g., garbled). In such implementations, positioner 102 can include resolver logic 110 to detect and resolve such conflicts based on feature data of the triggered content items. For instance, based on feature data of the triggered content items, resolver logic 110 can determine a conflict may exist amongst triggered content items on provider device 145, when triggered content items overlap in time and include the same display positioning data, such that if service application 147 were to generate, the consumable content of each triggered content item would be presented on the same location of a display on provider device 145.

In some implementations, resolver logic 110 can utilize a set of prioritization rules to determine which conflicting triggered content item to provide to provider device 145. In turn, service application 147 running on provider device 145 can generate a conflicting triggered content item, based on the set of prioritization rules. In other implementations, resolver logic 110 can utilize the set of prioritization rules to determine a ranking for each conflicting triggered content item. Additionally, based on that ranking, resolver logic 110 can determine and cause service application 147 running on provider device 145 to generate one conflicting triggered content item over the other conflicting triggered content items (e.g., by providing an instruction to the provider device 145).

In some implementations, one or more prioritization rules can be based on a current location of a service provider. For example, a prioritization rule can prioritize content items that are associated with triggering event related to a particular geographic region/location (e.g., entering a geographic region or location, for example an airport). As such, resolver logic 110 can utilize such a prioritization rule to determine which conflicting triggered content item of multiple conflicting triggered content items to prioritize for presentation.

In other implementations, resolver logic 110 can utilize a prioritization rule that is based on account information of a service provider. Additionally, the account information can include one or more network content preferences. A network content preference can indicate one or more conflicting triggered content items service application 147 to generate. Additionally, in various implementations, a network content preference can include ranking data. Ranking data can indicate how the service provider ranks or prioritizes one triggered content item from another triggered content item. For example, the ranking data can indicate that a service provider prioritizes the generation of a positioning recommendation higher than an ETR notification, but lower than incentive related content. Additionally, the positioning recommendation, the ETR notification and the incentive related content share the same triggering event and their respective feature data includes display positioning data indicating that the corresponding content items be generated on the same area on service application 147. As such, upon trigger logic 106 detecting the shared triggering event, resolver logic 110 can detect the conflict, and utilize such a prioritization rule (e.g., based on the ranking data) to prioritize the incentive related content for service application 147 to generate.

In some implementations, network content preferences can be based on historical driving data of the service provider. For example, in such implementations, the historical driving data can include data of each service session that indicates geographic regions/locations the service provider has been (e.g., based on location information provided by a location-based resource of provider device 145), service status information, sensor information (e.g., accelerometer data, gyroscope data, etc.) and/or data indicating a suggestion or recommendation notification the service provider opts into or out of. In such implementations, resolver logic 110 can utilize the historical driving data of the service providers to determine network content preferences. For example, the historical driving data indicates that during a service session, more often than not, a service provider opts into a positioning recommendation (e.g., provides an input via service application 147 that indicates acceptance of the positioning recommendation) and rejects an ETR notification (e.g., provided an input via service application 147 that indicates rejection of the positioning recommendation). As such, resolver logic 110 can determine a network content preference for the positioning recommendation over the ETR notification.

In various implementations, the historical data can implicitly indicate a network content preference. For example, the historical data indicates that during multiple service sessions, the service provider provided an input via service application 147 that indicates acceptance of the positioning recommendation. Additionally, based on the location information provided by the location-based resource of provider device 145, the service provider ultimately ends up in a geographic region or location that isn't included in the positioning recommendation. Moreover, based on the location information, the historical data indicates that the service provider usually is usually at in an airport geofence. As such, resolver logic 110 can determine a network preference for an airport queue notification over a positioning recommendation.

In some implementations, resolver logic 110 can provide a recommendation to the service provider (e.g., via service application 147), to change the network content preferences of the service provider. In such examples, resolver logic 110 can provide such a recommendation if resolver logic 110 determines the historical data of the service provider indicates a behavior of a service provider that is contrary to one or more network content preferences associated with the corresponding service provider account. For example, resolver logic 110 can determine that an account information of a corresponding service provider indicates a network content preference for a positioning recommendation for a food service. Additionally, resolver logic 110 determines that the historical driving data of the corresponding service provider indicates that during each service session, more often than not, the type of service the service provider is providing is related to a transport service rather than a food service. Moreover, resolver logic 110 can determine that the network content preferences of the service provider are contrary to the historical data of the service provider. As such, resolver logic 110 can cause service application 147 to generate a recommendation notification to change the network content preference from a positioning recommendation for a food service to a positioning recommendation for a transport service. In some implementations, the recommendation notification can enable the service provider to update or change the network content preferences. In other examples, resolver logic 110 can automatically update or change the network content preferences, in response to resolver logic 110 determining the network content preferences of the service provider are inconsistent with the historical driving data of the service provider.

In other implementations, prioritization rules can be based on service objectives (e.g., supply efficiency, greatest earnings, etc.). For example, trigger logic 106 can detect a trigger event. The trigger event is associated with three content items and content coordinator 108 obtains the three triggered content items. However, all three triggered content items, based on their respective feature data, will result in being generated on the same location or position on service application 147. As such, upon trigger logic 106 detecting the shared trigger event, resolver logic 110 can detect the conflict and determine which of the three triggered content items to be generated by service application 147 based on one or more service objectives (e.g., supply efficiency, greatest earnings, etc.). For instance, resolver logic 110 can determine that the triggered content item that can result in the greatest earnings for the service provider can be prioritized for service application 147 to generate, based on the service objective being the greatest earnings. In turn, service application 147 can generate consumable content for the service provider, based on triggered content items that are selected or otherwise provided for the provider based on an objective of maximizing the earnings of the provider, given the provider's location, service status, or other contextual information.

In various implementations, resolver logic 110 can rank each conflicting triggered content item relative to one or more service objectives to determine which of the conflicting triggered content items best achieves the one or more service objectives. For example, triggered content items selected for a service provider may include (i) a positioning recommendation, (ii) an offline suggestion, and (iii) an ETR notification. Additionally, the service object is supply efficiency of a geographic region. Moreover, the three triggered content items include display positioning data indicating that the corresponding triggered content items be generated the same location or position of service application 147. Upon trigger logic 106 detecting the shared trigger event, resolver logic 110 can rank each of the three conflicting triggered content items according to the resulting supply efficiency of the geographic location-based on (i) a current service state (e.g., the number of service requests specifying a pickup location in the geographic location provided by corresponding devices of the requesters and the number of available service providers in the geographic location, based on the location information and service status information of each provider device), (ii) a current location of the service provider or provider vehicle 140 (e.g., based on the location information provided by a location-based resource of provider device 145), and (iii) to what affect each of the three conflicting triggered content items can better increase the supply efficiency of that geographic region. Based on how each of the three conflicting triggered content items can better increase the supply efficiency of the geographic region, resolver logic 110 can determine a ranking for the three conflicting triggered content items. Additionally, based on the rankings, resolver logic 110 can determine which of the three conflicting triggered content items to prioritize for service application 147 to generate.

In some implementations, prioritization rules can be based on the status (e.g., online, offline, matched, on-route to a pick-up location, on-route to a destination location, type of service the service provider is providing, etc.) of the service provider. For example, the prioritization rules can be based on network content eligibility of the service provider (e.g., whether the type of service the service provider is providing is related to that type of service). For instance, two conflicting triggered content items are an airport queue notification and a positioning recommendation related to food services. Additionally, the service status information of the service provider indicates that type of service is related to food services (e.g., food delivery). Resolver logic 110 can determine that the positioning recommendation related to food services is more related to the type of service the service provider is to provide, than the airport queue notification. As such, resolver logic 110 can determine the positioning recommendation related to food services can be prioritized for service application 147 to generate.

In yet other implementations, prioritization rules can be based on the feature data of conflicting triggered content items. For example, the prioritization rules can be based on the TTL parameter of each conflicting triggered content item. As such, resolver logic 110 can determine which of the conflicting triggered content items are about to expire first, and the triggered content item that is about to expire first can be prioritized. Additionally, in variations of such implementations, if a second triggered content item is to expire after the expiration of the prioritized triggered content item, then resolver logic 110 can cause service application 147 to generate the second triggered content item. For example, based on the determination of resolver logic 110 that a second triggered content item is to expire after the expiration of the prioritized triggered content item, content coordinator 108 can provide feature data of the second content to service application 147 to generate. In other examples, based on the determination of resolver logic 110 that a second triggered content item is to expire after the expiration of the prioritized triggered content item, content coordinator 108 can provide feature data of the conflicting triggered content items in response to detecting a shared triggering event. Additionally, resolver logic 110 can provide an instruction to service application 147 to generate the second triggered content item after generating the prioritized triggered content item.

In various implementations, resolver logic 110 can utilize any combination of the aforementioned prioritization rules to determine which conflicting triggered content item service application 147 is to generate. For example, trigger logic 106 detects a shared triggering event that the service provider has entered an airport and resolver logic 110 determines a conflict between an airport queue notification and a positioning recommendation notification. As such, resolver logic 110 can utilize multiple prioritization rules to resolve the conflict. For instance, resolver logic 110 can utilize prioritization rules that specify (i) prioritizing a conflicting triggered content item associated with an airport geofence and (ii) prioritizing a conflicting triggered content item with the TTL parameter that expires earlier. As such, in such an example, resolver logic 110 can prioritize the airport queue notification, if resolver logic 110 determines that (i) the service provider is located within the airport geofence and (ii) the TTL parameter of the airport queue notification expires before the positioning recommendation notification. Additionally, in some implementations, resolver logic 110 can instruct provider device 145 to generate the positioning recommendation after the expiration of the airport queue notification. In such implementations, resolver logic 110 can determine that the TTL parameter of the airport queue notification is expires before the TTL parameter of the positioning recommendation.

Additionally, in various examples, one prioritization rule can be ranked higher than another prioritization rule. For instance, resolver logic 110 can still prioritize the airport queue notification even if (i) the service provider is located at the airport, (ii) the TTL parameter of the airport queue notification is longer than the positioning recommendation notification and (iii) based on the location information provided by a location-based resource of provider device 145 the service provider is within the geofence of an airport. In such instances, the prioritization rule that specifies prioritizing a conflicting triggered content item that is associated with an airport geofence is ranked higher than the prioritization rule that specifies prioritizing a conflicting triggered content item with the TTL parameter that expires earlier.

In some implementations, positioner 102 can include source failure logic 112. Source failure logic 112 can disable a network information service (e.g., network information service 120A) that is operating improperly or the corresponding content item causes service application 147 or provider device 145 to operate improperly. For example, positioner 102 can obtain content item from a network information service 120 upon detecting a corresponding trigger. However, upon providing the set of feature data of the content item to provider device 145, service application 147 operates improperly (e.g., crashes). In such an example, provider device 145 can provide data indicating that utilization of the set of feature data caused service application 147 to operate improperly (e.g., crash). In response to positioner 102 receiving such data, source failure logic 112 can determine which network information service is providing content item (e.g., feature data) that is causing the problems. As such, source failure logic 112 can provide an instruction to the offending network information service to stop providing the offending content item to positioner 102 or cause positioner 102 to stop receiving content item specifically from the offending network information service, without shutting down the entire network computer system 100.

Hardware Diagram

Figure 4:
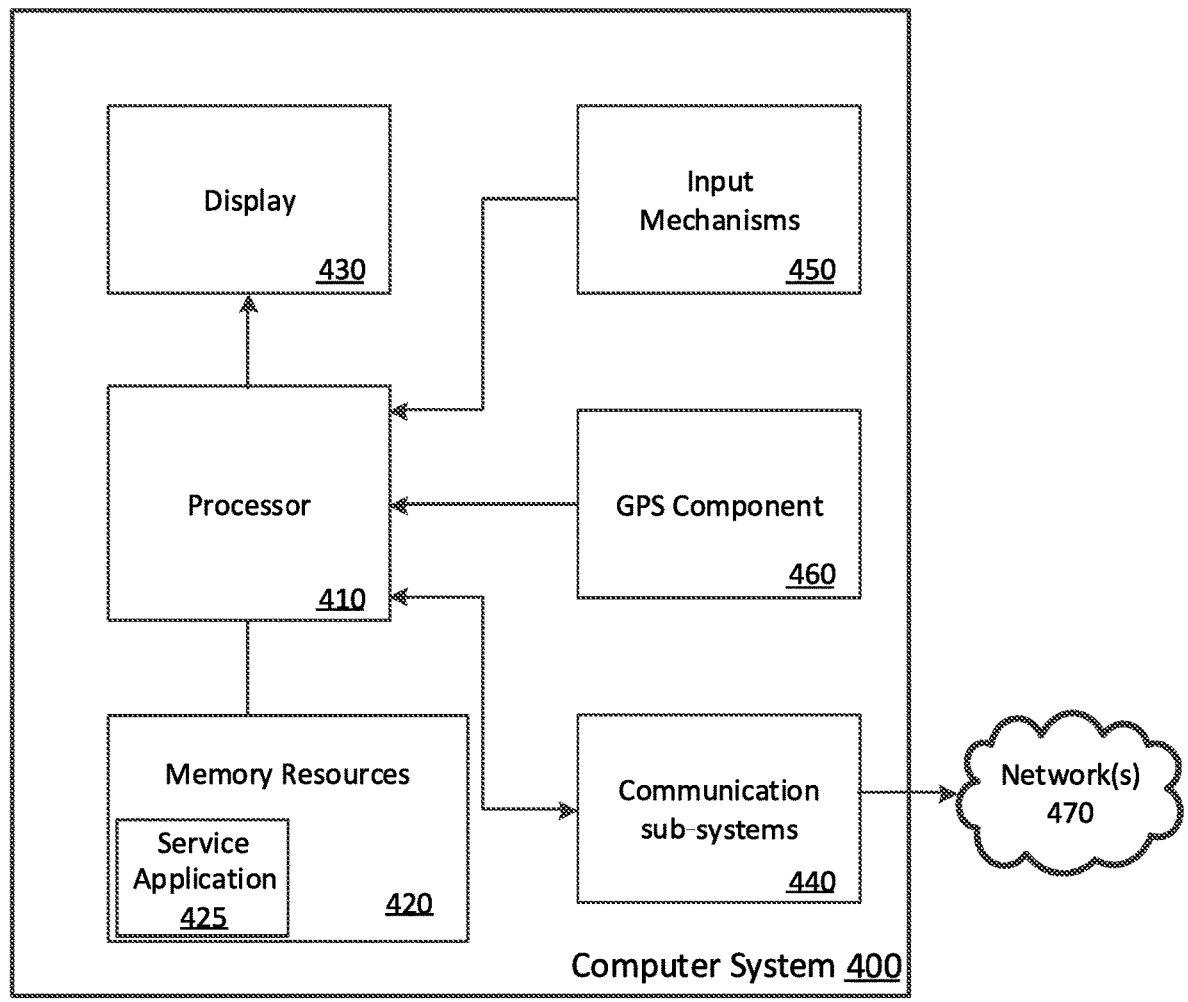
FIG. 4 illustrates a computer system upon which aspects described herein may be implemented.

FIG. 4 is a block diagram that illustrates a computer system upon which examples described herein may be implemented. In one embodiment, computer system 400 may correspond to a mobile computing device, such as a cellular device that is capable of telephony, messaging, and data services. Computer system 400 can correspond to a device operated by a requester or, in some examples, a device operated by the service provider (e.g., a freight operator) that provides location-based services. Examples of such devices include smartphones, handsets, tablet devices, or in-vehicle computing devices that communicate with cellular carriers. Computer system 400 includes processor 410, memory resources 420, display component 430 (e.g., such as a touch-sensitive display device), one or more communication sub-systems 440 (including wireless communication systems), one or more sensors 450 (e.g., accelerometer and/or gyroscope, microphone, barometer, etc.), one or more satellite receivers 460 or other location detection components (e.g., GPS component) 460, and input mechanisms 480. In one example, at least one communication sub-system 440 sends and receives cellular data over network(s) 470 (e.g., data channels and voice channels). Communication sub-systems 440 can include a cellular transceiver and one or more short-range wireless transceivers. Processor 410 can exchange data with a service arrangement system (not illustrated in FIG. 4) via the one or more communications sub-systems 440 and over network(s) 470.

Processor 410 can provide a variety of content to display component 430 by executing instructions stored in memory resources 420. Memory resources 420 can store instructions for service application 425. For example, processor 410 can execute service application 425 to read sensor data from one or more sensors 450 of the computing device, and to transmit the sensor data, along with location data of satellite receiver 460 as local device data to a network computer system (e.g. network computer system 100). In some examples, processor 410 can execute service application 425 to generate a user interface (e.g., UI 200 of FIG. 2). Additionally, processor 410 can obtain one or more content items from multiple content sources (e.g., network information service 120A, network information service 120B, . . . , network information service 120C) and cause service application 425 to generate consumable content based on feature data of each of the one or more content items (e.g., map 202, pin 206, pin 207, pin 208, area 210, heat map 212 and service provider graphic 204). In some examples, the consumable content can include a selectable feature that, when interacted with, can trigger a performance of an operation, such as transmit a request for a transport service to a network service (e.g., network computer system 100).

Figure 5:
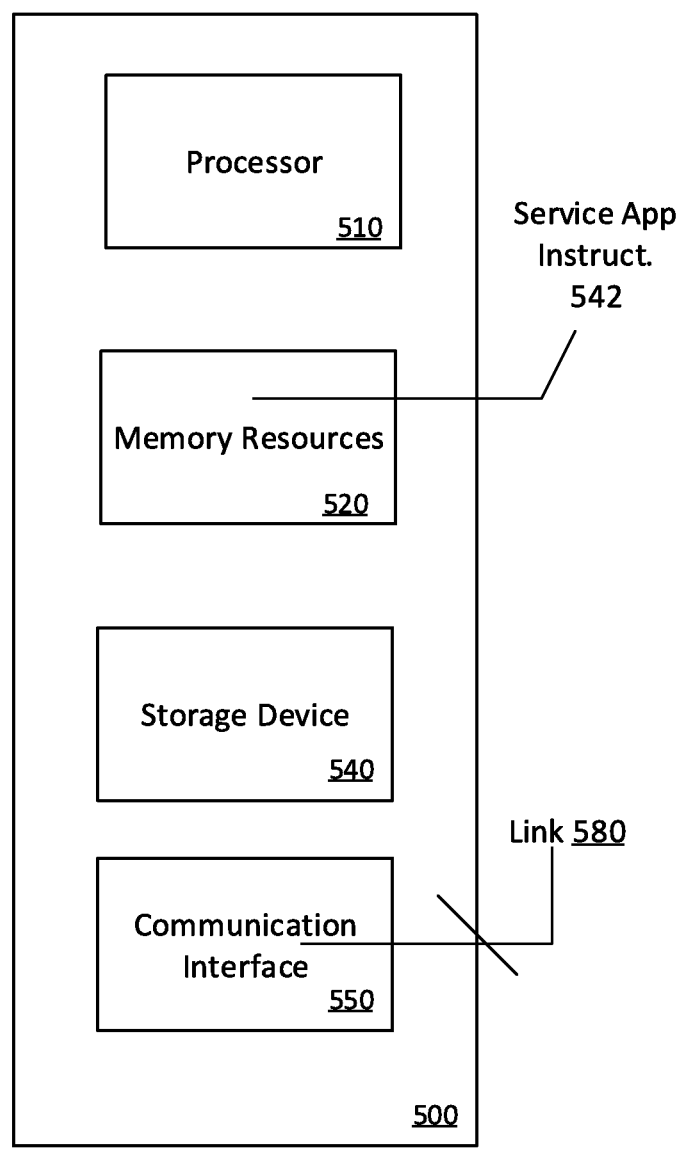
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as part of the of an example of FIG. 1. Likewise, the computer system 500 can implement a method such as described with the example method of FIG. 3.

In one implementation, the computer system 500 includes processing resources 510, memory resources 520 (e.g., read-only memory (ROM) or random-access memory (RAM)), a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the memory resources 520 or other static storage device for storing static information and instructions for the processor 510. The storage device 540, such as a magnetic disk or optical disk, is provided for storing information and instructions.

The communication interface 550 enables the computer system 500 to communicate with one or more networks (e.g., cellular network) through use of the network link 580 (wireless or a wire). Using the network link 580, the computer system 500 can communicate with one or more computing devices, specialized devices and modules, and/or one or more servers. The executable instructions stored in the memory 520 can include instructions 542, to implement a network computing system such as described with an example of FIG. 1. The executable instructions stored in the memory 520 may also implement a method, such as described with the example method of FIG. 3.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium, such as the storage device 540. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system to provide a network transport service, the computer system comprising:
one or more processors;
a set of memory resources to store a set of instructions and a set of prioritization rules, wherein the one or more processors use the set of instructions to:
detect a predefined trigger in connection with an activity performed by a service provider for the network transport service;
determine (i) at least one content item associated with the detected trigger, the determined content item originating from a corresponding network information service, and (ii) select a set of service parameters relating to a service session of the service provider based on the determined content item;
based on the set of service parameters, receive, from the corresponding network information service, feature data associated with the determined content item;
determine a priority of the determined content item based on the set of prioritization rules; and
cause an application running on a computing device of the service provider to display a graphical representation of the determined content item, based on the priority of the determined content item and the feature data of the determined content item.

2. The network computer system of claim 1, wherein the one or more processors use the set of instructions to further:
determined a second content item that is associated with the detected trigger, the determined second content item originating form a second network information service; and
detect a conflict between the content item and the determined second content item, the one or more processors utilizing of the set of prioritization rules as a response to the detected conflict.

3. The network computer system of claim 1, wherein the set of prioritization rules is based on a current location of the computing device.

4. The network computer system of claim 1, wherein the set of prioritization rules is based on profile information of the service provider, the profile information of the service provider including one or more content preferences.

5. The network computer system of claim 1, wherein the set of prioritization rules is based on historical driving data of the service provider.

6. The network computer system of claim 1, wherein the feature data includes a time to live (TTL) parameter, and wherein the set of prioritization rules is based on the TTL parameters.

7. The network computer system of claim 1, wherein the feature data of the content item includes positioning information indicating a location on a user interface of the application for the graphical representation of the determined content item.

8. The network computer system of claim 1, wherein the predefined trigger includes at least one of, a change in location of the computing device, a change in a state of a service environment, or a change in a service option associated with the service provider.

9. The network computer system of claim 1, wherein the content item includes at least one of a heat map, an estimated time to request notification, one or more pins, one or more markers, a recommendation notification, or a queue position notification.

10. A non-transitory computer readable medium storing instructions that, when executed by one or more processors of a network computer system, cause the one or more processors to:

detect a predefined trigger in connection with an activity performed by a service provider for a network transport service;

determine (i) at least one content item associated with the detected trigger, the determined content item originating from a corresponding network information service, and (ii) select a set of service parameters relating to a service session of the service provider based on the determined content item;

based on the set of service parameters, receive, from the corresponding network information service, feature data associated with the determined content item;

determine a priority of the determined content item based on a set of prioritization rules; and cause an application running on a computing device of the service provider to display a graphical representation of the determined content item, based on the priority of the determined content item and the feature data of the determined content item.

11. The non-transitory computer readable medium of claim 10, wherein the one or more processors use the instructions to further:

determine a second content item that is associated with the detected trigger, the determined second content item originating form a second network information service; and detect a conflict between the content item and the second content item, the one or more processors utilizing of the set of prioritization rules as a response to the detected conflict.

12. The non-transitory computer readable medium of claim 10, wherein the set of prioritization rules is based on a current location of the computing device.

13. The non-transitory computer readable medium of claim 10, wherein the set of prioritization rules is based on profile information of the service provider, the profile information of the service provider including one or more content preferences.

14. The non-transitory computer readable medium of claim 10, wherein the set of prioritization rules is based on historical driving data of the service provider.

15. The non-transitory computer readable medium of claim 10, wherein the feature data includes a time to live (TTL) parameter, and wherein the set of prioritization rules is based on the TTL parameters.

16. The network computer system of claim 10, wherein the feature data of the content item includes positioning information indicating a location on a user interface of the application for the graphical representation of the determined content item.

17. The non-transitory computer readable medium of claim 10, wherein the predefined trigger includes at least one of, a change in location of the computing device, a change in a state of a service environment, or a change in a service option associated with the service provider.

18. The non-transitory computer readable medium of claim 10, wherein the content item includes at least one of a heat map, an estimated time to request notification, one or more pins, one or more markers, a recommendation notification, or a queue position notification.

* * * * *